(12) United States Patent
Levenson et al.

(10) Patent No.: US 6,803,524 B2
(45) Date of Patent: Oct. 12, 2004

(54) LINE MANAGEMENT HOUSING AND LINE ROUTING DEVICE THEREIN

(75) Inventors: David W. Levenson, Duluth, GA (US); Glenn M. Mahony, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/367,350

(22) Filed: Feb. 14, 2003

(65) Prior Publication Data

US 2003/0121690 A1 Jul. 3, 2003

Related U.S. Application Data

(63) Continuation of application No. 09/604,176, filed on Jun. 27, 2000, now Pat. No. 6,541,704.

(51) Int. Cl.[7] .............................. H02B 1/00; H02G 3/04
(52) U.S. Cl. ........................ 174/99 R; 174/48; 361/826
(58) Field of Search ................................. 174/72 A, 48, 174/68.1, 71 R, 72 R, 99 R; 361/826

(56) References Cited

U.S. PATENT DOCUMENTS

| | | | | |
|---|---|---|---|---|
| 4,642,418 A | * | 2/1987 | Menchetti | 174/48 |
| 6,101,773 A | * | 8/2000 | Chau et al. | 52/220.7 |
| 6,195,493 B1 | * | 2/2001 | Bridges | 385/134 |
| 6,541,704 B1 | * | 4/2003 | Levenson et al. | 174/72 A |

* cited by examiner

*Primary Examiner*—Anthony Dinkins
*Assistant Examiner*—Adolfo Nino
(74) *Attorney, Agent, or Firm*—Woodcock Washburn LLP

(57) ABSTRACT

A housing has second and third bays, where each bay receives equipment therein. The housing also has a plurality of lines traveling therein from a site such as a first bay to the second bay and the third bay. A line routing device is positioned above the second and third bays and routes the lines from the site to the second and third bays. Each line is secured at a common securing point above the second and third bays, and each of the second and third bays has a vertical down-channel at one side thereof. Each line extends from the securing point, through the line routing device, and down one of the down-channels such that the line when positioned to hang in either down-channel hangs substantially the same length within such down-channel.

38 Claims, 4 Drawing Sheets

LINE MANAGEMENT HOUSING AND LINE ROUTING DEVICE THEREIN

CROSS-REFERENCE TO RELATED APPLICATIONS

This application is a continuation of Ser. No. 09/604,176, filed Jun. 27, 2000, entitled "Line Management Housing and Line Routing Device Therein," now U.S. Pat. No. 6,541,704, issued Apr. 1, 2003, the entirety of which is incorporated herein by reference.

FIELD OF THE INVENTION

The present invention relates to a housing through which multiple lines are routed from a source to multiple destinations. More particularly, the present invention relates to a line routing device in the housing that minimizes line tangling and otherwise routes the lines in an orderly manner.

BACKGROUND OF THE INVENTION

In many distribution-type applications, a relatively large plurality of lines originate from a common source, extend for some distance, and then at some point branch out to a plurality of destinations. For example, in a typical land-line telephone distribution network, a plurality of lines for a particular neighborhood or district originate at a central office or the like, travel together to a branching station in the neighborhood or district, and then branch out at the branching station to a plurality of telephone subscribers in such neighborhood or district. Each such line may be a twisted pair of copper wires, a coaxial cable, an individual optical fiber, etc. Additionally, each such line may be dedicated to a particular subscriber, dedicated to a plurality of subscribers, dynamically assigned to any of a plurality of subscribers, dynamically shared by a plurality of subscribers, etc.

The type of branching station employed may vary depending upon the type of line and the type of neighborhood or district. For example, for twisted-pair wires destined for a relatively sparsely populated residential area, the branching station may be a relatively small all-weather box or housing mounted to the side of a structure such as a telephone pole. For optic fibers and/or coaxial cables destined for a relatively large sub-division or office park, however, the branching station may be a much larger above- or below-ground vault or housing, on the order of six feet in width, 30 feet in length, and 12 feet in height.

A line arriving at a housing of a branching station from the central office may pass through such housing and on to an ultimate destination without a break therein. More typically, however, such line physically terminates at a point within the housing and is then routed toward an ultimate destination from such point by way of a physically separate but connected line portion. Accordingly, a line may in fact comprise a plurality of serially linked line portions, and a technician or the like may create or re-direct lines by combining, separating, and/or re-combining line portions at the point in the housing of the branching station.

Moreover, the branching station may include signal conditioning equipment for conditioning the signal on a line, signal adding equipment for adding a signal from another source, signal filtering equipment, and the like. For example, a particular line as instantiated by a plurality of line portions may arrive at a branching station from a central office of a telephone network, may pass through a line filter and/or conditioner, may then pass through a video signal adder, may then pass through another filter and/or conditioner, and then may depart the branching station for an ultimate destination. Accordingly, such particular line passes through several points in the housing of the branching station, and such technician may create or re-direct lines by combining, separating, and/or re-combining line portions at each point in the branching station.

In addition or in the alternative, the branching station may include demodulation equipment for demodulating one or more signals from the signal on the line. In such instance, the line continues from the branching station in the form of one or more demodulated lines, each of which has a demodulated signal from the line signal. Here, a technician may create or re-direct demodulated lines by combining, separating, and/or re-combining demodulated line portions at the branching station.

In one typical situation, a plurality of lines within a branching station travel from a first generally common point within the housing of the branching station to a plurality of second generally non-common points within the housing. For example, sixteen lines may travel from a circuit card in a first bay in the branching station to any of 256 circuit cards in a second bay in the branching station. In such a situation, the sixteen lines are typically physically bundled together at a position adjacent the first bay, and are then unbundled at a position adjacent the second bay to allow each unbundled line to extend to any of the 256 circuit cards in the second bay.

Considering that the unbundled portion of each of the sixteen lines can be quite long (fifteen feet, e.g.) in order to reach any of the circuit cards in the second bay, and considering that a plurality of such sixteen-line bundles (sixteen, e.g.) are likely traveling from the first bay to the second bay, it quickly becomes apparent that there may be many long, unbundled lines in the region of the second bay, and such long, unbundled lines can quickly become tangled and otherwise disordered.

To combat such tangling and disorder, a convention has been developed for the case of a single second bay. In such convention, each bundle has a breakout point at which each line thereof breaks out from the bundle, the single second bay has a generally vertical down-channel to the left, the breakout point of each bundle is secured at or adjacent the top of the down-channel, and each line from each bundle extends from the breakout point thereof down the down-channel.

Each line in the down-channel has a length such that the line can hang substantially to the bottom of the down-channel, assuming of course, the end of such line is not coupled to a circuit card or the like in the single second bay. Notably, a down-channel may be fifteen feet or longer in vertical length, and each line hanging in such down-channel is therefore a corresponding length. Thus, a hanging line can be taken up and attached to any circuit card or the like in any shelf, rack, etc. to the right in the single second bay.

It is to be understood that particularly in the case of a fiber optic line, such line cannot be bent beyond a minimum radius of curvature without affecting the transmission of light in such line. To prevent bending beyond such minimum radius, then, and to otherwise provide some order within the down-channel, such down-channel includes a number of spools around which any line in such down-channel may be routed. As should now be evident, each such spool has a minimum radius larger than the aforementioned minimum radius of the line, whereby any line may be routed around a spool without affecting the transmission of light in such line.

Thus, a hanging line may be taken up, routed around one or more spools in an orderly manner, and may then be routed up and/or to the right to a destination (i.e., the circuit card or the like) for attachment in the single second bay.

While the aforementioned convention works well in the case of a single second bay, certain issues arise in the instance where second and third bays aside each other (i.e., a pair of side-by-side second bays) are employed in the housing of the branching station. As may be appreciated, such second and third bays may be necessary when a single second bay does not have enough space for all of the circuit cards, racks, etc. normally housed in such single second bay.

As before, each of the second and third bays has a generally vertical down-channel to the left, each bundle has a breakout point at which each line thereof breaks out from the bundle, and the breakout points of all the bundles originating from the first bay are secured in the same general location. However, each line in each bundle must now be able to be extended and attached to any circuit card, rack, etc. in either the second bay or the third bay in an orderly manner. Correspondingly, each line from any bundle must have a length, and the breakout points of all the bundles must be appropriately positioned, such that each line can hang substantially to the bottom of either down-channel, assuming of course, the end of such line is not coupled to a circuit card or the like in either the second bay or the third bay. Moreover, each line, if initially extending into one of the second or third bays by way of the down-channel thereof, must be movable to extend into the other of the second or third bays by way of the down-channel thereof without undue difficulty and in an orderly manner, and also without tangling and other disorder.

One simple solution would seem to be to secure each breakout point at a location generally above the second bay and equidistant between the (left-side) down-channels of the second and third bays. However, such a solution is not always available, especially if there is not enough room at such location to accommodate the lines, as is often the case, or if accommodating such lines at such location would cause the lines to bend excessively, as is also often the case. Moreover, even if there is enough room at such location to accommodate the lines and the lines would not bend excessively, there is likely not enough room to include structures for routing and managing the lines at such location so as to combat tangling and dis-order.

Another simple solution would seem to be to employ a common down-channel between the second and third bays for the lines. However, such a solution is not available due to the convention that the down-channel at issue for each bay is provided to the left of such bay. In addition, such a solution is not available due to another convention that a separate down-channel for each bay is provided to the right of such bay for other purposes not especially relevant here. As may be appreciated, any common down-channel for the lines would hopelessly interfere with the right-side separate down-channel for the bay on the left.

Accordingly, a need exists for a device to route lines in the housing as between the second and third bays, where the device helps to minimize line tangling and otherwise routes the lines in an orderly manner, and where the device allows a line from any bundle with proper length to hang substantially to the bottom of either down-channel, assuming of course, the end of such line is not coupled to a circuit card or the like in either the second bay or the third bay.

SUMMARY OF THE INVENTION

In the present invention, a housing has second and third bays, where each bay receives equipment therein. The housing also has a plurality of lines traveling therein from a site such as a first bay to the second bay and the third bay. A line routing device is positioned generally above the second and third bays and routes the lines from the site to the second and third bays. Each line is secured at a generally common securing point above the second and third bays, and each of the second and third bays has a generally vertical down-channel at one side thereof. Each line extends from the securing point, through the line routing device, and down one of the down-channels such that the line when positioned to hang in either down-channel hangs substantially the same length within such down-channel.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
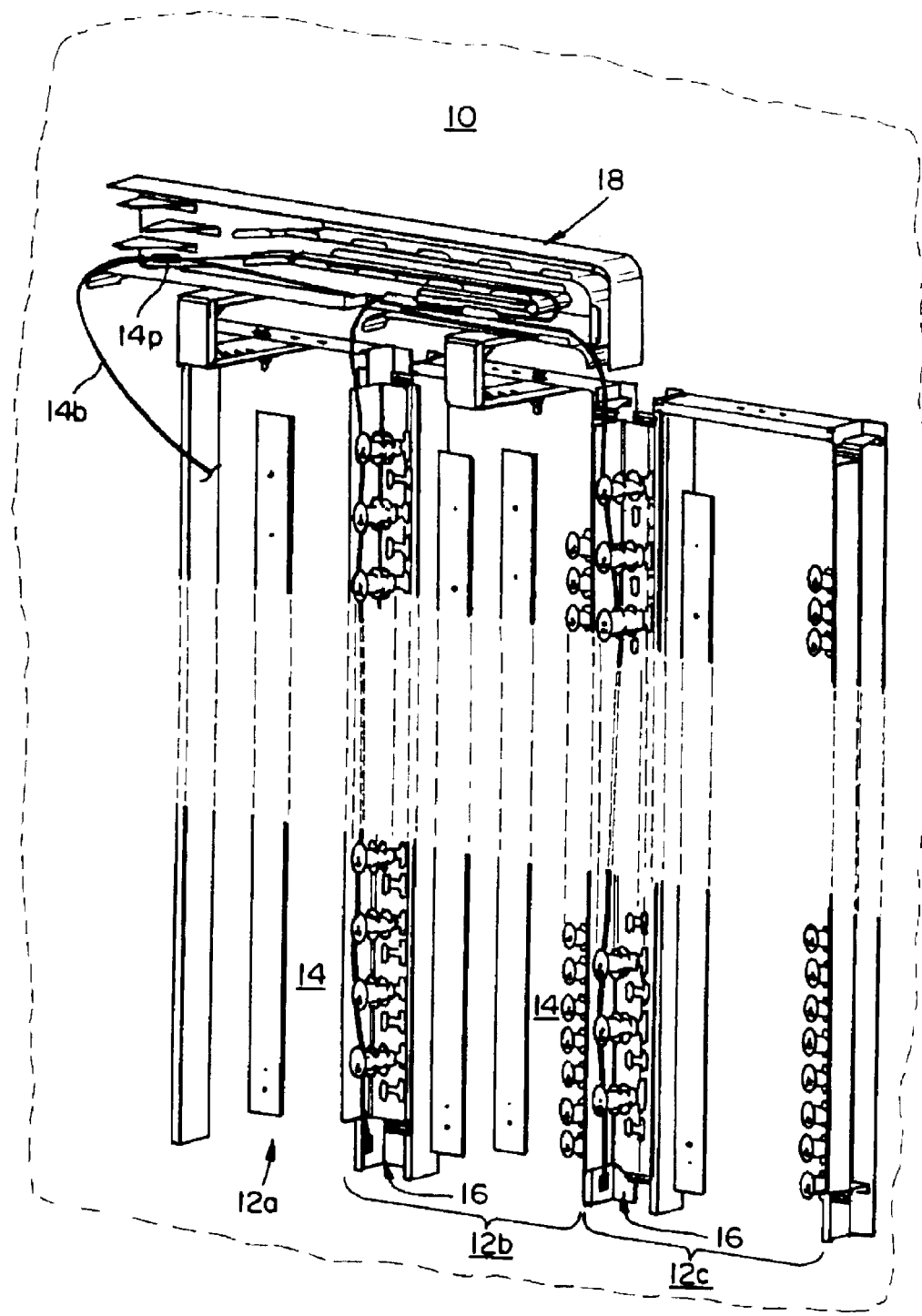
FIG. 1 is a perspective view of a housing having lines traveling from a first bay to a second or third bay by way of a line routing device in accordance with one embodiment of the present invention.

Certain terminology may be used in the following description for convenience only and is not considered to be limiting. For example, the words 'left', 'right', 'upper', and 'lower' designate directions in the drawings to which reference is made. Similarly, the words 'inwardly' and 'outwardly' are further directions toward and away from, respectively, the geometric center of the referenced object. The terminology includes the words above specifically mentioned, derivatives thereof, and words of similar import.

Referring now to FIG. 1, in the present invention, and as was discussed above, a housing 10 in a branch station or the like includes first, second, and third bays 12a, 12b, 12c. As was discussed above, the housing 10 and the bays 12a, 12b, 12c therein may be rather large, on the order of 15 feet in height. Of course, such housing 10 and such bays 12a, 12b, 12c may have any particular dimensions without departing from the spirit and scope of the present invention. As was also discussed above, in one typical situation, a plurality of lines 14 travel within the housing from the first bay 12a to the second bay 12b and the third bay 12c. As should be appreciated, though, the lines 14 may travel from origins/sources/sites other than the first bay 12a without departing from the spirit and scope of the present invention. For example, such lines 14 may travel directly from an input coupling on the housing 10 or from a source external to the housing and through an aperture and into the housing 10. Such lines 14 are organized into one or more bundles 14b (sixteen, for example), where each bundle 14b includes a plurality of the lines 14 (sixteen, for example). It is envisioned that each line 14 in each bundle 14*b* travels from a first circuit card, rack, etc. (not shown) in the first bay 12*a* to a second circuit card, rack, etc. (also not shown) in either the second or third bay 12*b*, 12*c*. However, the source/destination of each line 14 may vary without departing from the spirit and scope of the present invention.

As seen, the lines 14 in each bundle 14*b* are unbundled at a position adjacent the top of the second and third bays 12*b*, 12*c* to allow each unbundled line 14 to extend to any coupling location in the second or third bays 12*b*, 12*c*. Each bundle 14*b* thus has a breakout point 14*p* at which each line 14 thereof breaks out from the bundle 14*b*, where the breakout point 14*p* is secured at the aforementioned position at or adjacent the top of the second and third bays 12*b*, 12*c*.

Each of the second and third bays 12*b*, 12*c* has a generally vertical down-channel 16 to the left and each line 14 from each bundle 14*b* extends from the breakout point 14*p* thereof down one of the down-channels 16. Importantly, and as shown, each line 14 when positioned in either down-channel 16 hangs substantially the same length within such down-channel 16, assuming of course that the end of such line 14 is un-coupled. Preferably, each line 14 when positioned in either down-channel 16 hangs substantially to the bottom of such down-channel 16, assuming of course that the end of such line 14 is un-coupled.

Notably, both down-channels 16 have the same vertical length, which may be fifteen feet or longer, and each line 14 hanging in either down-channel 16 is therefore a corresponding length. Thus, a hanging line 14 hanging in the down-channel 16 of either the second or the third bay 12*b*, 12*c* can be taken up and attached to any circuit card or the like in any shelf, rack, etc. (not shown) to the right of such down-channel 14 and in such bay 12*b*, 12*c*. Note that each down-channel 16 may instead be to the right of the corresponding bay 12*b*, 12*c* without departing from the spirit and scope of the present invention. In such a case, the main space of the corresponding bay 12*b*, 12*c* would be to the left.

As was pointed out above, a fiber optic line cannot be bent beyond a minimum radius of curvature without affecting the transmission of light in such line. To prevent bending beyond such minimum radius in the case where each line 14 is such a fiber optic line, then, and to otherwise provide some order within each down-channel 16, such down-channel 16 includes a number of spools around which any line 14 in such down-channel 16 may be routed. Each such spool has a minimum radius larger than the aforementioned minimum radius of the line, whereby any line 14 may be routed around a spool without affecting the transmission of light in such line 14. Thus, a hanging line 14 may be taken up, routed around one or more spools in an orderly manner, and may then be routed up and/or to the right to a destination (i.e., the circuit card or the like) for coupling in the corresponding bay 12*b*, 12*c*.

In one embodiment of the present invention, and referring to FIGS. 2–9 in addition to FIG. 1, the housing 10 includes a line routing device 18 for routing lines 14 from the first bay 12*a* toward either the second or third bays 12*b*, 12*c*. In particular, the line routing device 18 routes such lines 14 such that the breakout points 14*p* of all the bundles 14*b* are secured at about the same location, and such that each line 14 may extend from its respective breakout point 14*p*, through the line routing device, and into one of the down-channels 16 of the second and third bays 12*b*, 12*c*, all without bending such line beyond the minimum radius of curvature thereof. Importantly, regardless of whether each line 14 is in the down-channel 16 of the second or third bays 12*b*, 12*c*, such line 14 when hanging in such down-channel 16 of such bay 12*b*, 12*c* hangs substantially the same length. Preferably, such line 14 hangs substantially to the bottom of such bay 12*b*, 12*c*, assuming of course the line 14 is not coupled at the end thereof.

As seen in FIGS. 2–9, the line routing device 18 includes a plurality of shelves 20, where each shelf 20 defines a raceway 22 generally thereabove through which a particular line 14 may be routed. In order to achieve the function of allowing each line 14 to hang substantially the same length regardless of whether such line 14 is in the down-channel 16 of the second or third bays 12*b*, 12*c*, each shelf 20/raceway 22 has a pre-determined length and routings between shelves 20/raceways 22 are pre-defined such each pre-defined routing has about the same length (i.e., linear distance of travel).

In one embodiment of the present invention, and as shown in the drawings, the line routing device 18 includes four shelves 20, where each shelf 20 extends generally horizontally in the housing 10 generally above the second (i.e., middle) bay 12*b*, and where the shelves 20 reside in generally parallel planes, with one shelf 20 on top (the top shelf 20), one on the bottom (the bottom shelf 20), and two in between (the middle top shelf 20 and the middle bottom shelf 20). As should be appreciated, other arrangements and orientations of shelves 20 may be employed without departing from the spirit and scope of the present invention. As shown, appropriate support and orientation hardware is employed to properly position the line routing device 18 with respect to the second and third bays 12*b*, 12*c* and specifically the down-channels 16 thereof.

In the line routing device 18 shown in the drawings, a plurality of securing brackets 24 are included for purposes of providing a convenient location to secure the breakout point 14*p* of each bundle 14*b* as such bundle 14*b* arrives from the first bay 12*a*. In particular, four such securing brackets 24 are shown, and such securing brackets 24 are mounted to the line routing device 18 generally one on top of each other, perhaps in a staggered fashion. However, other numbers of securing brackets 24 and other mounting orientations may be employed without departing from the spirit and scope of the present invention. Each such securing bracket 24 may include one or more apertures therethrough through which securing ties or straps may be passed when securing breakout points 14*p* to such securing bracket 24. In addition, each such securing bracket 24 may be removably secured to the line routing device 18, whereby the securing bracket 24 can be removed from the device 18 during securing of a breakout point 14*p* and thereafter re-mounted to the device 18. Any particular removably securing device may be employed in connection with each securing bracket 24 without departing from the spirit and scope of the present invention.

Thus, the securing brackets 24 generally define the beginning of the aforementioned linear distance of travel of each line 14 as such line travels through a routing defined by the line routing device 18 and then into the down-channel 16 of either the second or third bay 12*b*, 12*c*. Protocols may be defined regarding which securing bracket 24 the breakout point 14*p* of each bundle 14*b* should be secured to. Nevertheless, the breakout point 14*p* of each bundle 14*b* may be secured to any particular securing bracket 24 without departing from the spirit and scope of the present invention.

Figure 2:
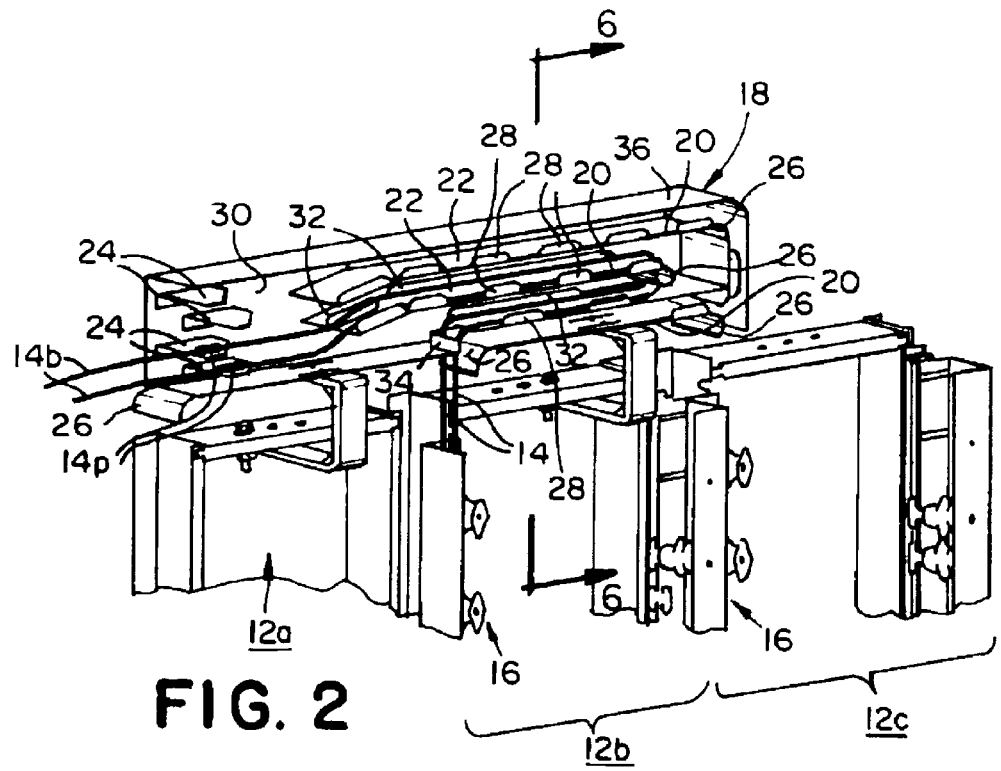
FIGS. 2–5 are perspective views of the line routing device in the housing of FIG. 1, and respectively show first through fourth routings of lines through such line routing device in accordance with one embodiment of the present invention.
Figures 6, 7:
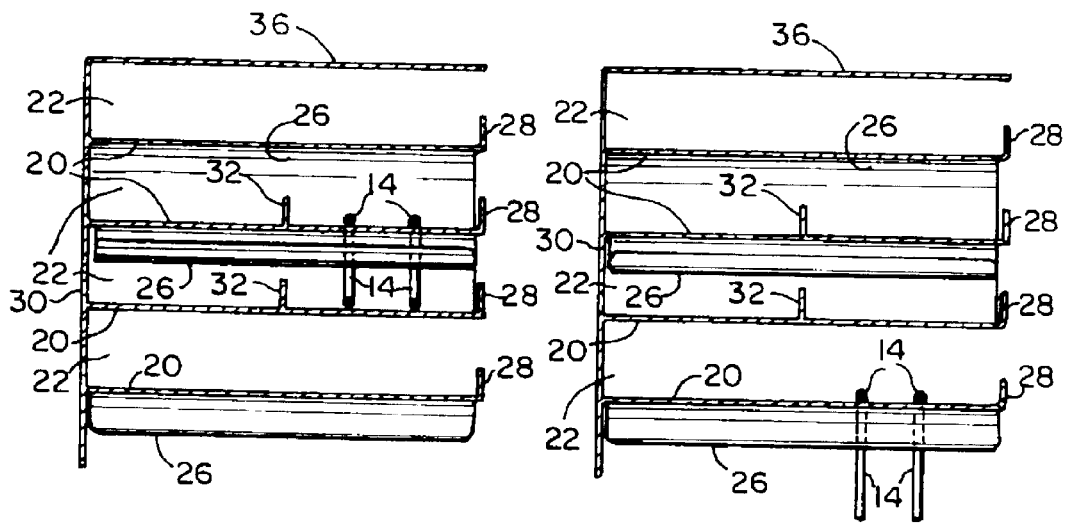
FIGS. 6–9 are cross-sectional views taken along the lines 6—6, 7—7, 8—8, and 9—9 of FIGS. 2–5, respectively.

Referring to FIGS. 2 and 6, now, a first particular routing is shown. As seen, such first routing is particularly accessible to lines 14 from bundles 14*b* secured (by way of respective breakout points 14*p*) to the bottom two securing brackets 24. As shown, the first routing starts at the left adjacent the securing brackets 24, then follows the raceway 22 defined by the middle top shelf 20 from the left to the right, then curves down and around from the middle top shelf 20 to the middle bottom shelf 20, then follows the raceway 22 defined by the middle bottom shelf 20 from the right to the left, then curves down from the middle bottom shelf 20 and 'spills' down and directly into the down-channel 16 to the left of and associated with the second bay 12b.

Figure 3:
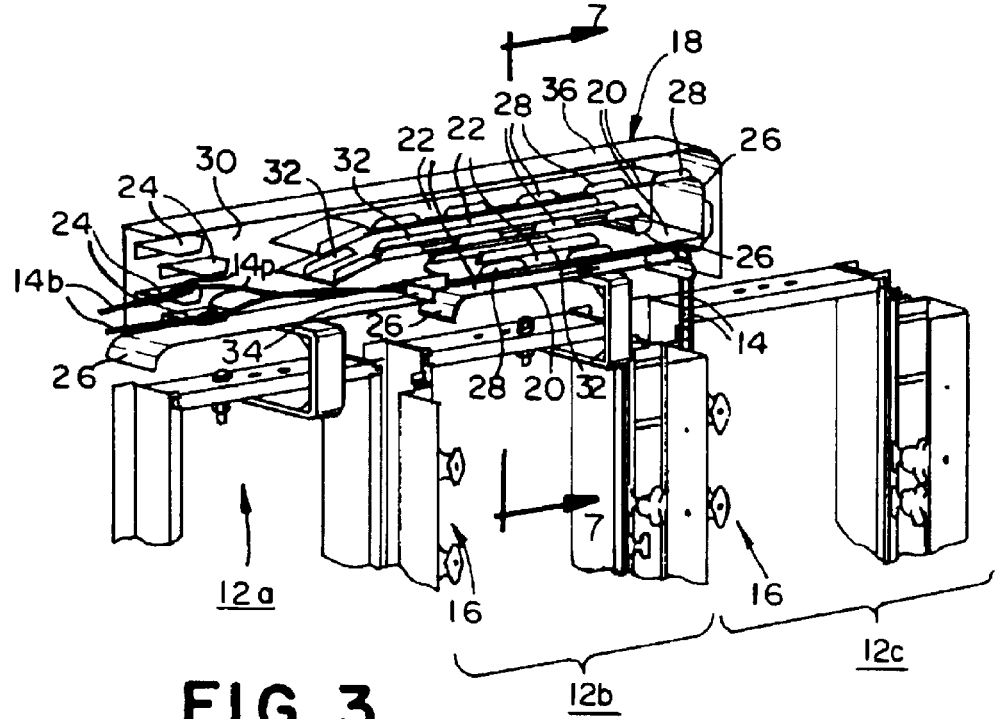

Referring to FIGS. 3 and 7, now, if a line 14 is originally routed to the second bay 12b according to the first routing, and it is then decided to re-route such line 14 to the third bay 12c, such line 14 is preferably so re-routed according to a second particular routing as is shown. As seen, like the first routing, such second routing is particularly accessible to lines 14 from bundles 14b secured (by way of respective breakout points 14p) to the bottom two securing brackets 24. As shown, the second routing starts at the left adjacent the securing brackets 24, then follows the raceway 22 defined by the bottom shelf 20 from the left to the right, then curves down from the bottom shelf 20 and 'spills' down and directly into the down-channel 16 to the left of and associated with the third bay 12b.

Importantly, the lengths of the various shelves 20/raceways 22 are selected so that the lengths (i.e., linear distances of travel) through the first and second routings are substantially the same. Thus, as was pointed out above a line 14 traveling through the first routing hangs substantially the same length within the down-channel 16 of the second bay 12b as compared with the same line 14 re-routed and traveling through the second routing and hanging within the down-channel 16 of the third bay 12c. The actual lengths of the various shelves 20/raceways 22 to accomplish the aforementioned hanging goal, and also to accomplish the aforementioned direct spilling into the respective down-channels, can be calculated in a readily apparent manner by the relevant public, and therefore need not be explained here in any detail.

In one embodiment of the present invention, a protocol is established wherein all lines 14 that are secured to the bottom two securing brackets 24 are initially routed to the second bay 12b by way of the first routing shown in FIGS. 2 and 6. Thereafter, if any such line 14 must be re-routed to the third bay 12c, such line 14 is removed from the first routing and then re-positioned in the second routing, as is shown in FIGS. 3 and 7. If need be, any line routed to the third bay 12c by way of the second routing may be re-routed to the second bay 12b by removing such line 14 from the second routing and then re-positioning the line 14 in the first routing. It should be noted that in re-routing as between the first and second routings, any line 14 must be withdrawn all the way back to the breakout point 14p of the bundle from which such line 14 originates. Thereafter, the re-routing must start from such breakout point 14p. Accordingly, repeated routing and re-routing of lines 14 through the first and second routings can be done without weaving such lines into an intractable mess, and with a minimum of tangling, disorder, and the like, thus resulting in a neater housing 10. As will be recognized, other protocols may be employed without departing from the spirit and scope of the present invention.

Figure 4:
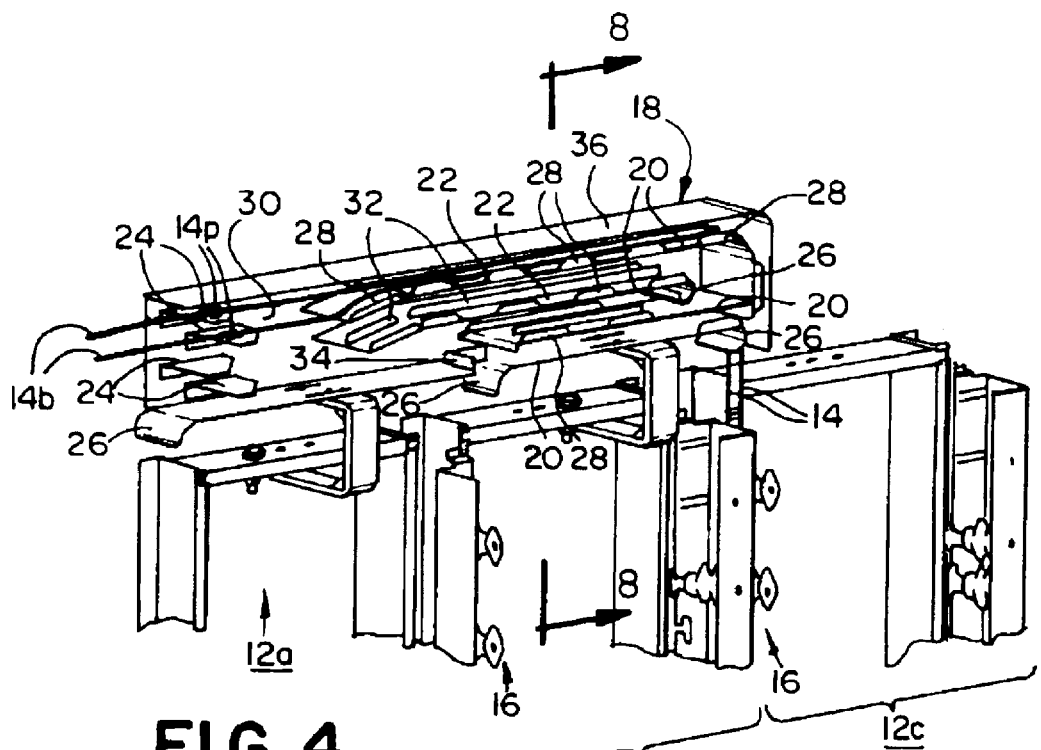
Figures 8, 9:
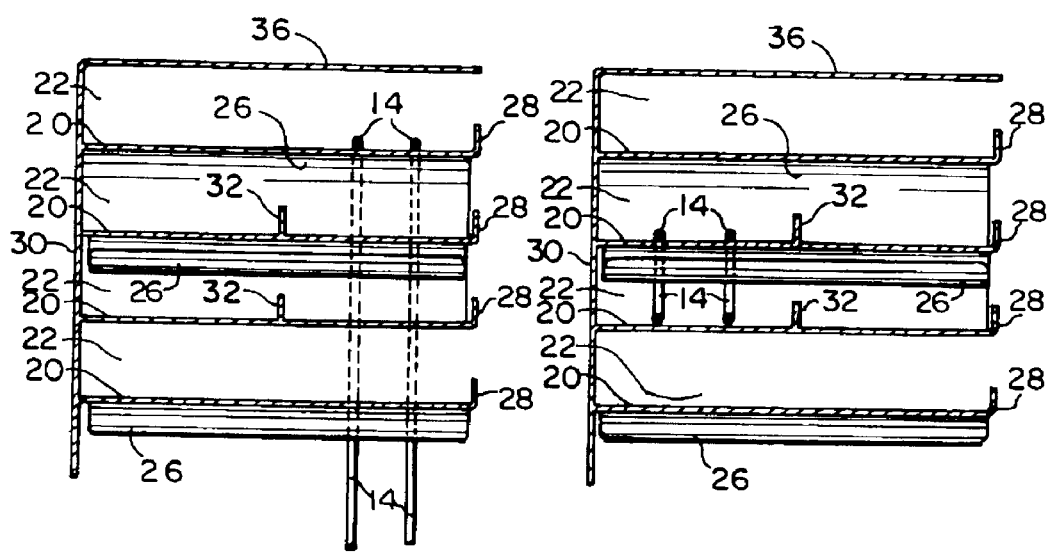

Referring to FIGS. 4 and 8, now, a third particular routing is shown. As seen, such third routing is particularly accessible to lines 14 from bundles 14b secured (by way of respective breakout points 14p) to the top two securing brackets 24, in a manner similar to th way the first and second routings are particularly accessible to lines 14 from bundles 14b secured to the bottom two securing brackets 24. As shown, the third routing starts at the left adjacent the securing brackets 24, then follows the raceway 22 defined by the top shelf 20 from the left to the right, then curves down from the top shelf 20 and 'spills' down and directly into the down-channel 16 to the left of and associated with the third bay 12c.

Figure 5:
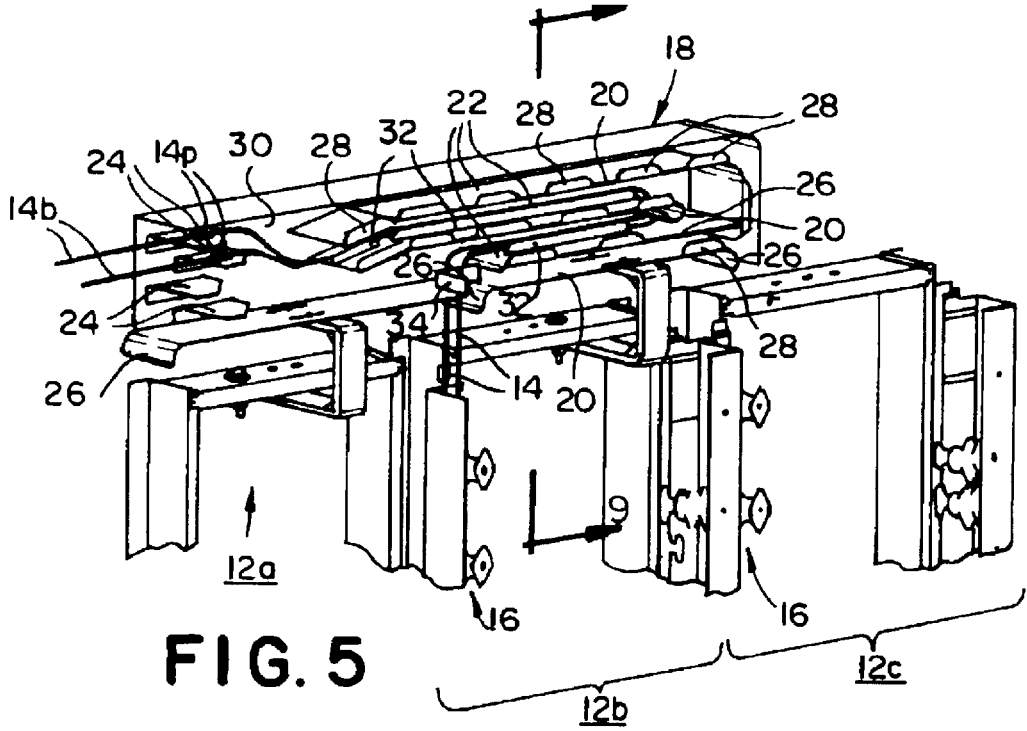

Referring to FIGS. 5 and 9, now, if a line 14 is originally routed to the third bay 12c according to the third routing, and it is then decided to re-route such line 14 to the second bay 12b, such line 14 is preferably so re-routed according to a fourth particular routing as is shown. As seen, like the third routing, such fourth routing is particularly accessible to lines 14 from bundles 14b secured to the top two securing brackets 24. As shown, the fourth routing starts at the left adjacent the securing brackets 24, then follows the raceway 22 defined by the middle top shelf 20 from the left to the right, then curves down and around from the middle top shelf 20 to the middle bottom shelf 20, then follows the raceway 22 defined by the middle bottom shelf 20 from the right to the left, then curves down from the middle bottom shelf 20 and 'spills' down and directly into the down-channel 16 to the left of and associated with the second bay 12b. As may now be appreciated, the fourth routing is substantially identical to the first routing, except that the fourth routing originates at the top two securing brackets 24 while the first routing originates at the bottom two securing brackets 24.

As before, the lengths of the various shelves 20/raceways 22 are selected so that the lengths (i.e., linear distances of travel) through the third and fourth routings are substantially the same. Moreover, since as was pointed out above the first and fourth routings are substantially identical, and since the lengths through the first and second routings are substantially the same, then so too are the lengths through the second and third routings substantially the same. Thus, as was pointed out above a line 14 traveling through any of the first through fourth routings hangs substantially the same length in the corresponding down-channel 16 of the second or third bays 12b, 12c. The actual lengths of the various shelves 20/raceways 22 to accomplish the aforementioned hanging goals, and also to accomplish the aforementioned direct spilling into the respective down-channels, can be calculated in a readily apparent manner by the relevant public, and therefore need not be explained here in any detail.

In one embodiment of the present invention, a protocol is established wherein all lines 14 that are secured to the top two securing brackets 24 are initially routed to the third bay 12c by way of the third routing shown in FIGS. 4 and 8. Thereafter, if any such line 14 must be re-routed to the second bay 12b, such line 14 is removed from the third routing and then re-positioned in the fourth routing, as is shown in FIGS. 5 and 9. If need be, any line routed to the second bay 12b by way of the fourth routing may be re-routed to the third bay 12c by removing such line 14 from the fourth routing and then re-positioning the line 14 in the third routing. As with re-routing between the first and second routings, it should be noted that when re-routing between the third and fourth routings, any line 14 must be withdrawn all the way back to the breakout point 14p of the bundle from which such line 14 originates. Thereafter, the re-routing must start from such breakout point 14p. Accordingly, repeated routing and re-routing of lines 14 through the third and fourth routings can be done without weaving such lines 14 into an intractable mess, and with a minimum of tangling, disorder, and the like, thus resulting in a neater housing 10. As will be recognized, other protocols may be employed without departing from the spirit and scope of the present invention.

As should be appreciated, and as shown in the drawings, additional features may be provided to the shelves 20 and/or the line routing device 20 for added convenience and neatness, among other things. As but one feature, each shelf 20 may be provided with an appropriate curving trail-off 26 in appropriate locations where a line 14 in any of the first through fourth routings curves down from such shelf 20. Preferably, each curving trail-off 26 has a radius of curvature larger than the above-discussed minimum radius of curvature of the lines 14 so as to prevent bending of such lines 14 beyond such minimum radius.

As another feature, each shelf 20 may be provided with one or more lateral retaining tabs 28 on one or both lateral sides thereof to prevent lines 14 from laterally slipping out during transiting through routings defined by such shelf 20. In the line routing device 18 shown in the drawings, such lateral retaining tabs 28 are needed on only the front lateral side of each shelf 20 since each of the shelves 20 in such device 20 is mounted to a back wall 30 which can perform the retaining function thereat. However, such lateral retaining tabs 28 may be provided at the back lateral side of each shelf 20 if need be without departing from the spirit and scope of the present invention.

As yet another feature, certain ones of the shelves 20 may be provided with mid-raceway tabs 32 to in effect divide the raceways 22 thereof into front and back raceways. As may be appreciated, such divided raceways 22 are useful when the shelf 20/raceway 22 defines multiple routings therethrough. In the embodiment shown in the drawings, where the first and fourth routings through the shelves 20/raceways 22 are generally identical except that the first routing originates from the bottom two securing brackets 24 while the fourth routing originates from the top two securing brackets 24, the mid-raceway tabs 32 may be employed on the middle top shelf 20 and the middle bottom shelf 20 to delineate front raceways 22 associated with the first routing and rear raceways 22 associated with the fourth routing. Thus, the mid-raceway tabs 32 clearly segregate lines 14 in the first routing from lines 14 in the fourth routing.

As yet a further feature, a diverter 34 is employed adjacent the bottom shelf 20 to divert lines 14 in the second routing (FIGS. 3 and 7) entering the bottom shelf 20 from the bottom securing brackets 24 around lines 14 in the first and fourth routings (FIGS. 2 and 6 and FIGS. 5 and 9) spilling from the middle bottom shelf 20 directly into the down-channel 16 of the second bay 12b. Thus, such second routing and such first/fourth routings are separated in such region, and the potential for tangling thereat is reduced if not eliminated.

As yet even another feature, a protective shell 36 is positioned above the raceway 22 defined by the top shelf 20. As may be appreciated, then, lines 14 in the third routing (FIGS. 4 and 8) and in such top shelf 20 are protected from above, and are also at least somewhat retained from above, by the protective shell 36. As may also be appreciated, such protecting and retaining from above functions are performed for each of the other shelves 20 by the respective shelf 20 above such other shelf 20. As seen, the protective shell 36 may extend down and generally define one longitudinal end of the line retaining device 18 opposite the securing brackets 24. Thus, the lines 14 in the third routing (FIGS. 4 and 8) spilling down from the top shelf 20 are protected at such longitudinal end, and are also at least somewhat retained at such longitudinal end, by the protective shell 36.

Note that the present invention has heretofore been discussed in terms of routing as between two bays 12b, 12c. It is to be appreciated that multiple ones of the device 18 may be employed in a generally stacked manner to route as between greater numbers of bays. For example, for four bays (not shown), one upper device 18 could spill into each of two lower devices 18, where one lower device 18 spills into two bays and the other lower device 18 spills into another two bays. As may be appreciated, in such an arrangement, each line 14 may be rather lengthy in order to route through the upper device 18, then one of the two lower devices 18, and then into one of the down-channels 16 of the four bays.

As should now be understood, in the present invention, a housing 10 and line routing device 18 in such housing 10 are provided to route lines 14 in the housing 10 from a first bay 12a to either a second or third bay 12b, 12c, where the device 18 helps to minimize line tangling and otherwise routes the lines 14 in an orderly manner. The device 18 allows each line 14 to hang substantially the same length within the left-side down-channel 16 of either of the second or third bays 12b, 12c, assuming of course, the end of such line 14 is not coupled to a circuit card or the like in either the second or third bays 12b, 12c. Changes could be made to the embodiments described above without departing from the broad inventive concepts thereof. For example, rather than routing lines 14 from a first bay to the left, such device 18 can route lines 14 from a first bay to the right, if the device 18 is properly constructed generally in left-right mirror-image as compared with the embodiment shown in the drawings. Likewise, rather than routing lines 14 to left-side down-channels 16, such device 18 can route lines 14 to right-side down-channels, if the device 18 is appropriately positioned to spill such lines 14 directly into such right-side down-channels. It is understood, therefore, that the present invention is not limited to the particular embodiments disclosed, but is intended to cover modifications within the spirit and scope of the present invention as defined by the appended claims.

What is claimed is:

1. A housing comprising second and third bays, each bay for receiving equipment therein, the housing also comprising a plurality of lines traveling therein from a site such as a first bay to the second bay and the third bay, the housing further comprising a line routing device positioned generally above the second and third bays and routing the lines from the site to the second and third bays, each line being secured at a generally common securing point above the second and third bays, each of the second and third bays having a pre-defined generally vertical down-channel at one side thereof, each line extending from the securing point, through the line routing device, and spilling from the line routing device directly down and into one of the pre-defined down-channels such that the line when positioned to hang in either pre-defined down-channel hangs substantially the same length within such pre-defined down-channel.

2. The housing of claim 1 further comprising at least one securing bracket corresponding to the securing point.

3. The housing of claim 1 wherein the lines are organized into bundles, each bundle including a plurality of the lines, and wherein the lines in each bundle are unbundled at a breakout point corresponding to the securing point.

4. The housing of claim 3 wherein each breakout point is secured at the securing point above the second and third bays.

5. The housing of claim 1 wherein each pre-defined down-channel has a top and a bottom substantially opposite the top, and wherein each line when positioned to hang in either pre-defined down-channel hangs substantially to the bottom of such pre-defined down-channel.

6. The housing of claim 1 wherein the line routing device has a plurality of shelves, each shelf defining an adjacent raceway, the lines being routed through the raceways according to a first pre-determined routing to the pre-defined down-channel of the second bay and to a second predetermined routing to the pre-defined down-channel of the third bay, each of the first and second routings having about the same length.

7. The housing of claim 6 wherein each shelf extends generally horizontally and defines an adjacent raceway generally thereabove.

8. The housing of claim 6:
wherein the line routing device has a top shelf, a middle shelf and a bottom shelf,
wherein the first routing starts at the securing point, then follows the raceway defined by the top shelf generally away from the securing point, then curves around and down from the top shelf to the middle shelf, then follows the raceway defined by the middle shelf generally toward the securing point, then curves down from the middle shelf and spills generally directly into the pre-defined down-channel of the second bay, and
wherein the second routing starts at the securing point, then follows the raceway defined by the bottom shelf generally away from the securing point, then curves down from the bottom shelf and spills generally directly into the pre-defined down-channel of the third bay.

9. The housing of claim 8 further comprising a diverter adjacent the bottom shelf to divert lines in the second routing entering the bottom shelf from the securing point around lines in the first routing spilling from the middle bottom shelf into the pre-defined down-channel of the second bay.

10. The housing of claim 6:
wherein the line routing device has a top shelf, a middle shelf and a bottom shelf;
wherein the first routing starts at the securing point, then follows the raceway defined by the top shelf generally away from the securing point, then curves down from the top shelf and spills generally directly into the pre-defined down-channel of the third bay; and
wherein the second routing starts at the securing point, then follows the raceway defined by the middle shelf generally away from the securing point, then curves around and down from the middle shelf to the bottom shelf, then follows the raceway defined by the bottom shelf generally toward the securing point, then curves down from the bottom shelf and spills generally directly into the pre-defined down-channel of the second bay.

11. The housing of claim 6:
wherein the line routing device has a top shelf, a middle top shelf, a middle bottom shelf, and a bottom shelf;
wherein the first routing starts at the securing point, then follows the raceway defined by the middle top shelf generally away from the securing point, then curves around and down from the middle top shelf to the middle bottom shelf, then follows the raceway defined by the middle bottom shelf generally toward the securing point, then curves down from the middle bottom shelf and spills generally directly into the pre-defined down-channel of the second bay; and
wherein the second routing starts at the securing point, then follows the raceway defined by the bottom shelf generally away from the securing point, then curves down from the bottom shelf and spills generally directly into the pre-defined down-channel of the third bay,
the lines being further routed through the raceways according to a third pre-determined routing to the pre-defined down-channel of the third bay, each of the first, second, and third routings having about the same length, the third routing starting at the securing point, then following the raceway defined by the top shelf generally away from the securing point, then curving down from the top shelf and spilling generally directly into the down-channel of the third bay.

12. The housing of claim 11 wherein the lines are further routed through the raceways according to a fourth predetermined routing to the pre-defined down-channel of the third bay substantially identical to the first routing.

13. The housing of claim 12 wherein the middle top shelf and the middle bottom shelf are provided with mid-raceway tabs to divide the raceways thereof into front and back raceways.

14. The housing of claim 13 wherein the front raceways are employed by one of the first and fourth routings and the rear raceway s are employed by the other of the first and fourth routings.

15. The housing of claim 12 further comprising at least one top securing bracket and at least one bottom securing bracket corresponding to the securing point, wherein the first and second routings are particularly accessible from the bottom securing bracket, and wherein the third and fourth routings are particularly accessible from the top securing bracket.

16. The housing of claim 15 wherein a line secured to the bottom securing bracket is routed by the first routing to the pre-defined down-channel of the second bay, wherein a line secured to the bottom securing bracket is routed by the second routing to the pre-defined down-channel of the third bay, wherein a line secured to the top securing bracket is routed by the third routing to the pre-defined down-channel of the third bay, and wherein a line secured to the top securing bracket is routed by the fourth routing to the pre-defined down-channel of the second bay.

17. The housing of claim 16 wherein all lines secured to the bottom securing bracket are initially routed by the first routing to the pre-defined down-channel of the second bay, and wherein all lines secured to the top securing bracket are initially routed by the third routing to the pre-defined down-channel of the third bay.

18. The housing of claim 17 wherein any line secured to the bottom securing bracket is re-routable between the first routing to the pre-defined down-channel of the second bay and the second routing to the pre-defined down-channel of the third bay, and wherein any line secured to the top securing bracket is re-routable between the third routing to the down-channel of the third bay and the fourth routing to the pre-defined down-channel of the second bay.

19. The housing of claim 18 wherein any line prior to re-routing must be withdrawn from the shelves and substantially to the securing point thereof.

20. The housing of claim 6 wherein at least some of the shelves are provided with curving trail-offs in locations where the first and second routings curve.

21. The housing of claim 6 wherein at least some of the shelves are provided with a lateral retaining tab to prevent a line in a raceway thereof from laterally slipping out during transiting therethrough.

22. A line routing device for a housing comprising second and third bays, each bay for receiving equipment therein, the housing also comprising a plurality of lines traveling therein from a site such as a first bay to the second bay and the third bay, the line routing device for being positioned generally above the second and third bays and for routing the lines from the site to the second and third bays, each line being secured at a generally common securing point above the second and third bays, each of the second and third bays having a pre-defined generally vertical down-channel at one side thereof, each line extending from the securing point, through the line routing device, and spilling from the line routing device directly down and into one of the pre-defined down-channels such that the line when positioned to hang in either pre-defined down-channel hangs substantially the same length within such pre-defined down-channel;

the device comprising a plurality of shelves, each shelf defining an adjacent raceway, the lines for being routed through the raceways according to a first pre-determined routing to the pre-defined down-channel of the second bay and to a second pre-determined routing to the pre-defined down-channel of the third bay, each of the first and second routings having about the same length.

23. The device of claim 22 further comprising at least one securing bracket corresponding to the securing point.

24. The device of claim 22 wherein each pre-defined down-channel has a top and a bottom substantially opposite the top, and wherein each line when positioned to hang in either pre-defined down-channel hangs substantially to the bottom of such pre-defined down-channel.

25. The device of claim 22 comprising a top shelf, a middle shelf and a bottom shelf, wherein the first routing starts at the securing point, then follows the raceway defined by the top shelf generally away from the securing point, then curves around and down from the top shelf to the middle shelf, then follows the raceway defined by the middle shelf generally toward the securing point, then curves down from the middle shelf and spills generally directly into the pre-defined down-channel of the second bay; and wherein the second routing starts at the securing point, then follows the raceway defined by the bottom shelf generally away from the securing point, then curves down from the bottom shelf and spills generally directly into the pre-defined down-channel of the third bay.

26. The device of claim 25 further comprising a diverter adjacent the bottom shelf to divert lines in the second routing entering the bottom shelf from the securing point around lines in the first routing spilling from the middle bottom shelf into the pre-defined down-channel of the second bay.

27. The device of claim 22 comprising a top shelf, a middle shelf and a bottom shelf, wherein the first routing starts at the securing point, then follows the raceway defined by the top shelf generally away from the securing point, then curves down from the top shelf and spills generally directly into the pre-defined down-channel of the third bay; and wherein the second routing starts at the securing point, then follows the raceway defined by the middle shelf generally away from the securing point, then curves around and down from the middle shelf to the bottom shelf, then follows the raceway defined by the bottom shelf generally toward the securing point, then curves down from the bottom shelf and spills generally directly into the pre-defined down-channel of the second bay.

28. The device of claim 22 comprising a top shelf, a middle top shelf, a middle bottom shelf, and a bottom shelf, wherein the first routing starts at the securing point, then follows the raceway defined by the middle top shelf generally away from the securing point, then curves around and down from the middle top shelf to the middle bottom shelf, then follows the raceway defined by the middle bottom shelf generally toward the securing point, then curves down from the middle bottom shelf and spills generally directly into the pre-defined down-channel of the second bay; and wherein the second routing starts at the securing point, then follows the raceway defined by the bottom shelf generally away from the securing point, then curves down from the bottom shelf and spills generally directly into the pre-defined down-channel of the third bay, the lines for being further routed through the raceways according to a third pre-determined routing to the pre-defined down-channel of the third bay, each of the first, second, and third routings having about the same length, the third routing starting at the securing point, then following the raceway defined by the top shelf generally away from the securing point, then curving down from the top shelf and spilling generally directly into the down-channel of the third bay.

29. The device of claim 28 wherein the lines are for being further routed through the raceways according to a fourth pre-determined routing to the pre-defined down-channel of the third bay substantially identical to the first routing.

30. The device of claim 29 wherein the middle top shelf and the middle bottom shelf are provided with mid-raceway tabs to divide the raceways thereof into front and back raceways.

31. The device of claim 30 wherein the front raceways are employed by one of the first and fourth routings and the rear raceways are employed by the other of the first and fourth routings.

32. The device of claim 29 further comprising at least one top securing bracket and at least one bottom securing bracket corresponding to the securing point, wherein the first and second routings are particularly accessible from the bottom securing bracket, and wherein the third and fourth routings are particularly accessible from the top securing bracket.

33. The device of claim 32 wherein a line secured to the bottom securing bracket is routed by the first routing to the pre-defined down-channel of the second bay, wherein a line secured to the bottom securing bracket is routed by the second routing to the pre-defined down-channel of the third bay, wherein a line secured to the top securing bracket is routed by the third routing to the pre-defined down-channel of the third bay, and wherein a line secured to the top securing bracket is routed by the fourth routing to the pre-defined down-channel of the second bay.

34. The device of claim 33 wherein all lines secured to the bottom securing bracket are initially routed by the first routing to the pre-defined down-channel of the second bay, and wherein all lines secured to the top securing bracket are initially routed by the third routing to the pre-defined down-channel of the third bay.

35. The device of claim 34 wherein any line secured to the bottom securing bracket is re-routable between the first routing to the pre-defined down-channel of the second bay and the second routing to the pre-defined down-channel of the third bay, and wherein any line secured to the top securing bracket is re-routable between the third routing to the down-channel of the third bay and the fourth routing to the pre-defined down-channel of the second bay.

36. The device of claim 35 wherein any line prior to re-routing must be withdrawn from the shelves and substantially to the securing point thereof.

37. The device of claim 22 wherein at least some of the shelves are provided with curving trail-offs in locations where the first and second routings curve.

38. The device of claim 22 wherein at least some of the shelves are provided with a lateral retaining tab to prevent a line in a raceway thereof from laterally slipping out during transiting therethrough.

* * * * *